(12) United States Patent
Lakner et al.

(10) Patent No.: US 7,546,314 B1
(45) Date of Patent: Jun. 9, 2009

(54) CUSTOMIZING APPLICATION PROGRAMS (75) Inventors: Timo Lakner, Speyer (DE); Jens C. Ittel, Rauenberg (DE); Uwe Reeder, Riegelsberg (DE)

(73) Assignee: SAP AG, Walldorf (DE)

( * ) Notice: Subject to any disclaimer, the term of this patent is extended or adjusted under 35 U.S.C. 154(b) by 462 days.

(21) Appl. No.: 10/850,798

(22) Filed: May 21, 2004

(51) Int. Cl.
*G06F 17/00* (2006.01)
(52) U.S. Cl. ............... 707/104.1; 707/100; 717/108; 717/122
(58) Field of Classification Search ........... 707/100, 707/104.1; 395/600; 717/108, 122
See application file for complete search history.

(56) References Cited

U.S. PATENT DOCUMENTS

| | | | |
|---|---|---|---|
| 5,386,559 A * | 1/1995 | Eisenberg et al. | 707/201 |
| 2004/0125152 A1 * | 7/2004 | Sommers et al. | 345/856 |
| 2004/0250238 A1 * | 12/2004 | Singh et al. | 717/108 |

* cited by examiner

*Primary Examiner*—Tony Mahmoudi
*Assistant Examiner*—Fariborz Khoshnoodi
(74) *Attorney, Agent, or Firm*—Finnegan, Henderson, Farabow, Garrett & Dunner L.L.P.

(57) ABSTRACT

Methods and apparatus, including computer program products, for storing and using customization data. A repository contains one or more repository objects, one or more variants for each repository object, and one or more layers for each variant. Each repository object has one or more model entities. The variants for each repository object are arranged in a first hierarchy, and the layers for each variant are arranged in a second hierarchy. Each layer includes a set of customization values, each customization value corresponding to one of the model entities. Customization values can be (but need not be) provided for each model entity in each layer and in each variant. The variants and layers can be arranged in order of specificity. A customization value for a model entity can be retrieved by locating the most specific variant and the most specific layer that contains a customization value for the model entity.

25 Claims, 6 Drawing Sheets

CUSTOMIZING APPLICATION PROGRAMS

BACKGROUND

The present invention relates to data processing by digital computer, and more particularly to application programming.

Users of an application program may need to customize the runtime behavior of the application program based on user preferences. For example, if the application program is deployed by an enterprise having users with different roles in the enterprise, the behavior of the application program may need to be customized for each user role within the enterprise. In addition, it may be necessary to customize the application program based on other user specific factors, such as the geographical location of the user or the language preferences of the user.

Applications can be developed using various architectures, including, for example, a model-view-controller (MVC) architecture. The MVC architecture breaks an application into three separate parts—models, views, and controllers. Each model can have multiple views, where each view displays information about the model to a user. A controller of the model receives events, for example, raised by a user interacting with a view to manipulate the model. Each model can have multiple controllers, and a controller can relate to multiple views. The models and the controllers typically include application code. When changes occur in a model, the model updates its views. Data binding can be used for data transport between the view and its model or controller.

An application program developed using the MVC architecture can be customized by customizing the models used by the application.

SUMMARY OF THE INVENTION

The invention provides methods and apparatus, including computer program products, that implement techniques for storing and using customization data.

In one general aspect, the techniques feature use of a runtime repository to store customization data. The repository contains one or more repository objects, one or more variants for each repository object, and one or more layers for each variant. Each repository object has one or more model entities. The variants for each repository object are arranged in a first hierarchy, and the layers for each variant are arranged in a second hierarchy. Each layer includes a set of customization values, and each customization value corresponds to one of the model entities. Customization values can be (but need not be) provided for each model entity in each layer and in each variant.

Advantageous implementations can include one or more of the following features. One or more of the repository objects can be related according to a model. The first hierarchy can organize the variants for each repository object in order of specificity from a most specific variant to a least specific variant. The second hierarchy can organize the layers in order of specificity from a most specific layer to a least specific layer. The least specific variant can be a base variant, and the least specific layer can be a base layer. The base variant for each repository object can include default values for the model entities in the repository object.

In another aspect, the techniques feature a computer program product with instructions that are operable to cause data processing equipment to receive an identification of a model entity in an object with multiple model entities, and an identification of a starting layer and a starting variant in a repository. The repository stores customization values for the model entities in the object. The customization values are arranged in variants, and within each variant, in layers. Each layer includes a subset of the customization values. The variants are organized according to a first hierarchy and the layers are organized according to a second hierarchy. The instructions are further operable to cause the data processing equipment to search for an applicable customization value for the identified model entity from the customization values in the repository by searching for an applicable variant in a portion of the first hierarchy starting with the starting variant and searching for an applicable layer in a portion of the second hierarchy starting with the starting layer.

Advantageous implementations can include one or more of the following features. Searching for the applicable variant can include locating a most specific variant in the portion of the first hierarchy starting with the starting variant that contains a customization value for the identified model entity. Searching for the applicable layer can include locating within the most specific variant a most specific layer in the portion of the second hierarchy starting with the starting layer that contains a customization value for the identified model entity.

The instructions can be further operable to cause the data processing equipment to retrieve the customization value for the identified model entity in the most specific layer, or to retrieve a default value for the identified model entity if no applicable customization value is found.

The starting variant can be specified when the repository is opened, and the starting layer can be specified as a configuration setting.

In another aspect, the techniques feature a computer a computer program product with instructions that are operable to cause data processing equipment to receive a specification of an object with one or more model entities, create one or more variants for the object in a repository, and within each variant, create one or more layers for the object. The variants are arranged in a first hierarchy, and the layers are arranged in a second hierarchy. The instructions are further operable to cause the data processing equipment to receive a first set of customization values for one or more of the model entities, an identification of a first variant within the first hierarchy, and an identification of a first layer within the second hierarchy, and to store the first set of customization values in the first layer in the first variant.

Advantageous implementations can include one or more of the following features. The instructions can be further operable to cause the data processing equipment to receive a second set of customization values for one or more of the model entities and an identification of a second layer within the second hierarchy, and to store the second set of customization values in the second layer in the first variant. The first and second sets of customization values can be received independently of each other.

The instructions can be further operable to cause the data processing equipment to modify the first and second hierarchies. Modifying the first hierarchy can include adding a new variant to the first hierarchy or deleting an existing variant from the first hierarchy; similarly, modifying the second hierarchy can include adding a new layer to the second hierarchy or deleting an existing layer from the second hierarchy.

The instructions can also be operable to cause the data processing equipment to mark a customization value in the first set of customization values as a final value, in order to indicate that the customization value cannot be overridden by another customization value in a variant subsequent to the first variant in the first hierarchy or in a layer subsequent to the first layer in the second hierarchy. Where the variants and layers are organized in order of specificity, a subsequent variant is a more specific variant, and a subsequent layer is a more specific layer.

In addition, the instructions can be further operable to cause the data processing equipment to receive an identification of a starting variant and a starting layer, and, for each model entity in the object, retrieve a customization value for the model entity by searching for an applicable variant in a portion of the first hierarchy starting with the starting variant and searching for an applicable layer in a portion of the second hierarchy starting with the starting layer. The applicable variant can be a most specific variant in the portion of the first hierarchy starting with the starting variant that contains a customization value for the model entity, and the applicable layer can be a most specific layer in a portion of the second hierarchy starting with the starting layer in the applicable variant that contains a customization value for the model entity.

The techniques can be implemented to realize one or more of the following advantages. The application program can be customized at runtime. The application program can be customized without modifying the application program. If an application program is upgraded by releasing a new version, customization data specified for prior versions of the application program can be used to customize the new version. One or more variants can be specified for model entities used by the application program, the variants having a hierarchical relationship, where each variant specifies customization data for the model entities according to a specified criterion, e.g., a particular domain, role, or application area. In addition, one or more layers can be specified, the layers having a hierarchical relationship, where each layer specifies customization data for the model entities required for a particular party. The variants and layers are used to independently provide customization data for the model entities. Customization data provided by the variants and layers can be deltas (or incremental changes) from a base application program, or an existing variant or layer. The customization data specified by all the variants and layers can be merged at runtime to obtain customization data specific to a particular criteria and a particular party. Each party can perform its customization in its own layer independently of the customizations being performed by other parties in their own respective layers. The customizations specified by one or more different layers can be merged together at runtime to make them effective at the same time. Each party may provide an alternative customization in their own layers without affecting the customizations of the other layers. One implementation of the invention provides all of the above advantages.

These general and specific aspects can be implemented using a computer program, a method, a system or apparatus, or any combination of computer programs, methods, or systems. Details of one or more embodiments of the invention are set forth in the accompanying drawings and in the description below. Other features, objects, and advantages of the invention will be apparent from the description, the drawings, and the claims.

BRIEF DESCRIPTION OF THE DRAWINGS

Like reference numbers and designations in the various drawings indicate like elements.

DETAILED DESCRIPTION

Figure 1:
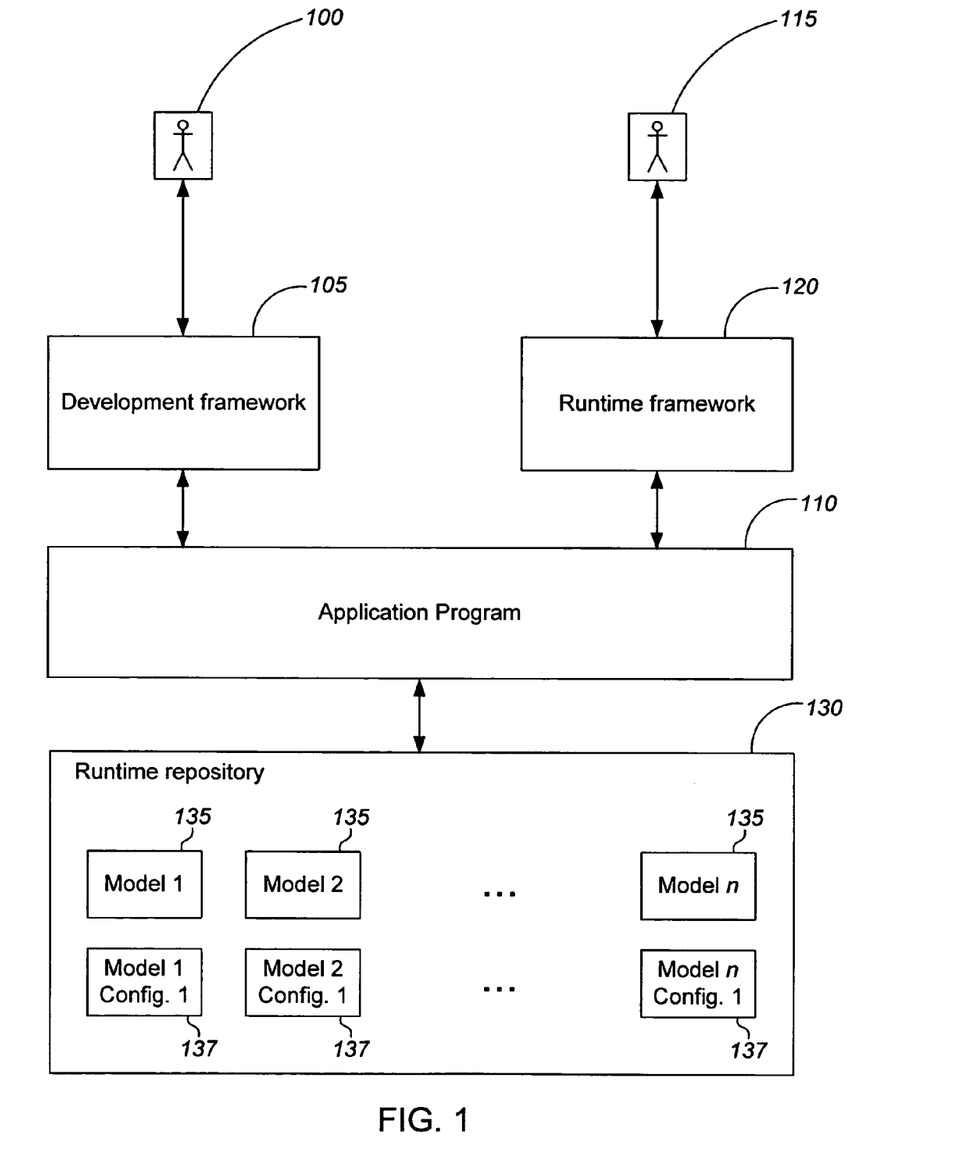
FIG. 1 illustrates an example environment for developing and running an application program.

FIG. 1 illustrates an example environment for developing and running an application program 110. The environment includes a development framework 105 and a runtime framework 120. An application developer 100 uses the development framework 105 at design time to develop the application program 110. The application program 110 can maintain, that is, store and administer, its own application data (e.g., transient application data). Such application data can be, for example, scalar data, tables, or structures. The application program 110 can also use one or more model objects 135 and refer to model data that persists in a corresponding instance of a model object 135. The model objects 135 are developed at design time and stored in a runtime repository 130. The runtime repository is also used to store customization or configuration data 137 associated with the model objects 135. The customization data for a model object can be viewed as an instance of the model object, whereas the model object itself can be viewed as a structural description or definition of the object. At design time, the definition of a model, as well as the customization data for the defined model, can be provided. At runtime, the runtime framework 120 retrieves the instances of the model objects 135 used by the application program 110.

The model objects 135 can be used to structure data in the runtime repository 130. A model object has one or more model classes. The model classes can have properties, methods and relations (e.g., aggregations and associations) to other model classes. Model objects 135 can have one or more model entities (e.g., attributes, functions, etc.) that can be assigned values. Model objects 135 can be grouped together into Main Repository Objects, which are logical units in the runtime repository. In one implementation, a Main Repository Object (MRO) can be stored as a file in the runtime repository 130. Model objects 135 in the runtime repository 130 can be customized by specifying new values for the model entities of the model objects 135. In one implementation, MROs are also used for versioning, i.e., all model objects 135 in an MRO are versioned together.

More than one customization can be specified for a model object 135 or a MRO (collectively referred to as repository objects), such that multiple values are specified for a model entity by different customizations. For example, repository object customizations can be specified by multiple versions of an application, or by multiple parties in a distribution chain of the application. The correct value of the model entity to be used for a specified customization of the repository object must be retrieved, in order to instantiate a repository object having the specified customization. In some cases, if a repository object has more than one model entity, values of different model entities must be retrieved and merged from multiple, disparate customizations, in order to create an instance of the repository object with the specified customization. For example, if a repository object 130 contains two model entities, the appropriate value to use for the first entity can be a value that is set by a first party in a first customization, and the appropriate value to use for the second entity can be a value that is set by a second party in a second customization.

In order to facilitate the retrieval of model entity values for a specified customization, customization values of model entities in each repository object in the runtime repository 130 are structured and stored using variants, and layers. Variants and layers represent two separate dimensions for specifying customizations of a repository model object.

A variant represents a customization of a repository object in the runtime repository 130 according to a specified criterion (or identified sets of criteria), such as a particular domain, role, or application area. In one implementation, each variant defines a variation of a repository object by defining incremental changes (or deltas) with reference to the repository object or other variants of the repository object. The variants for a repository object have a hierarchical relationship represented by a variant graph. A variant can have more than one predecessor variant in the variant graph. Each variant is represented by a variant name and a non-empty list of predecessor variants. If a variant has two or more predecessor variants, a predecessor priority is assigned to each predecessor variant. The runtime repository provides a base variant (named "base") for each repository object. The base variant is the root node of the variant graph for the repository object.

A layer represents a customization of a repository object in the runtime repository 130 specified by different parties. Parties customizing a repository object can include a specific user or a group of users, a specific customer or a group of customers, or a specific developer or a group of developers for the application program. Each party that needs to customize repository objects in the runtime repository 130 defines its own layer. Layers are used to store user specific customization data for a repository object. In one implementation, layers define customization data as an incremental change (or delta) with reference to the repository object, a variant of the repository object, or other layers. Layers enable users of the application program to customize repository objects used by the application program without modifying the repository object. All layers for the runtime repository have a hierarchical relationship represented by a layer graph. Each layer is represented by its name and a reference to its predecessor layer in the layer tree. If a layer has two or more predecessor layers, a predecessor priority is assigned to each predecessor layer. The root node of the layer tree is a base layer (named "base") that is defined by the runtime repository.

Given this arrangement of variants and layers, a customization of a repository object is identified by specifying a variant and a layer. The specified variant and layer are used to identify all the relevant customization values of model entities for the repository object by searching for defined values of the model entity starting from the most specific variant to the most general variant, and within each variant, from the most specific layer to the most general layer.

Figure 2A:
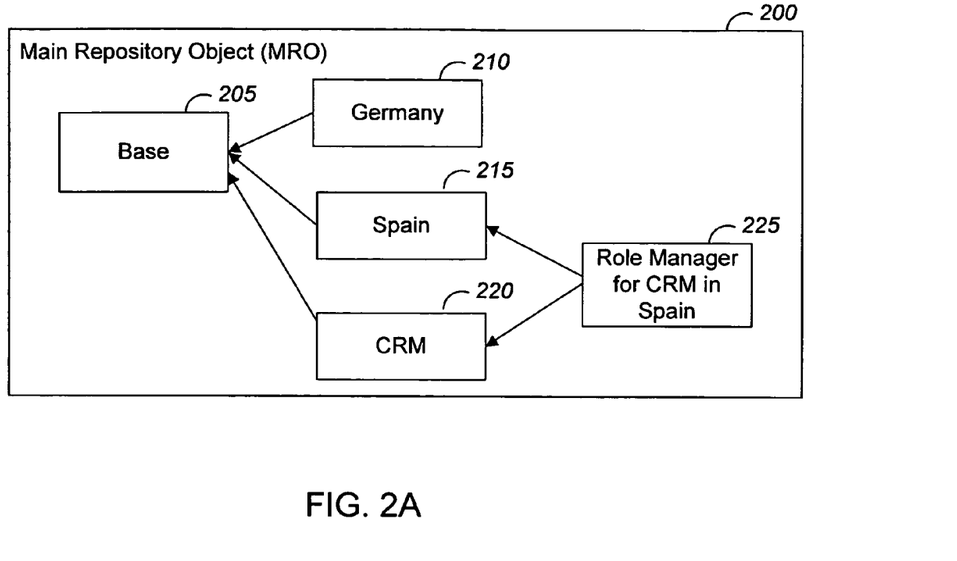
FIG. 2A illustrates an example of a variant graph for a repository object.

FIG. 2A illustrates an example of a variant graph defined by variants for a repository object 200. Five variants are defined for the repository object 200: a base variant 205, a variant for Germany 210, a variant for Spain 215, a variant for Customer Relationship Manager (CRM) 220, and a variant for a role manager for CRM in Spain 225. The variants for Germany 210, Spain 215, and CRM 220 are descendants of the base variant 205. The variant for the role manager in Spain 225 has two predecessors, the variant for Spain 215 and the variant for CRM 220. The variant for Spain 215 is specified as being the predecessor having a higher priority.

Figure 2B:
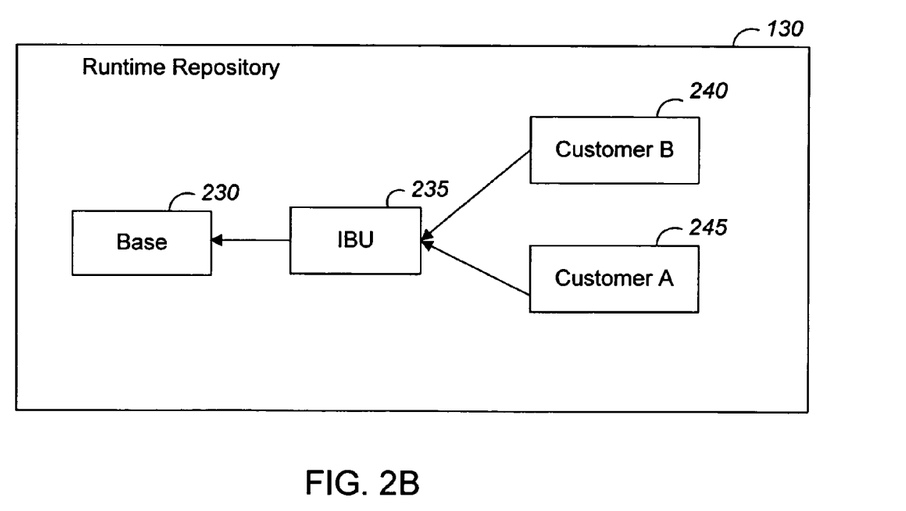
FIG. 2B illustrates an example of a layer graph for a runtime repository.

FIG. 2B is an example illustrating a layer tree representing the layers defined for the runtime repository 130. Layers are defined for the runtime repository and apply to each repository object in runtime repository 130. Four layers are defined: a base layer 230, an IBU layer 235, a Customer A layer 245, and a Customer B layer 240. The layers for Customer A 245 and Customer B 240 descend from the IBU layer 235, and the IBU layer 235 descends from the base layer 230. Customization data corresponding to each layer can be specified for each variant defined by the variant graph of layer 2A.

Figure 3:
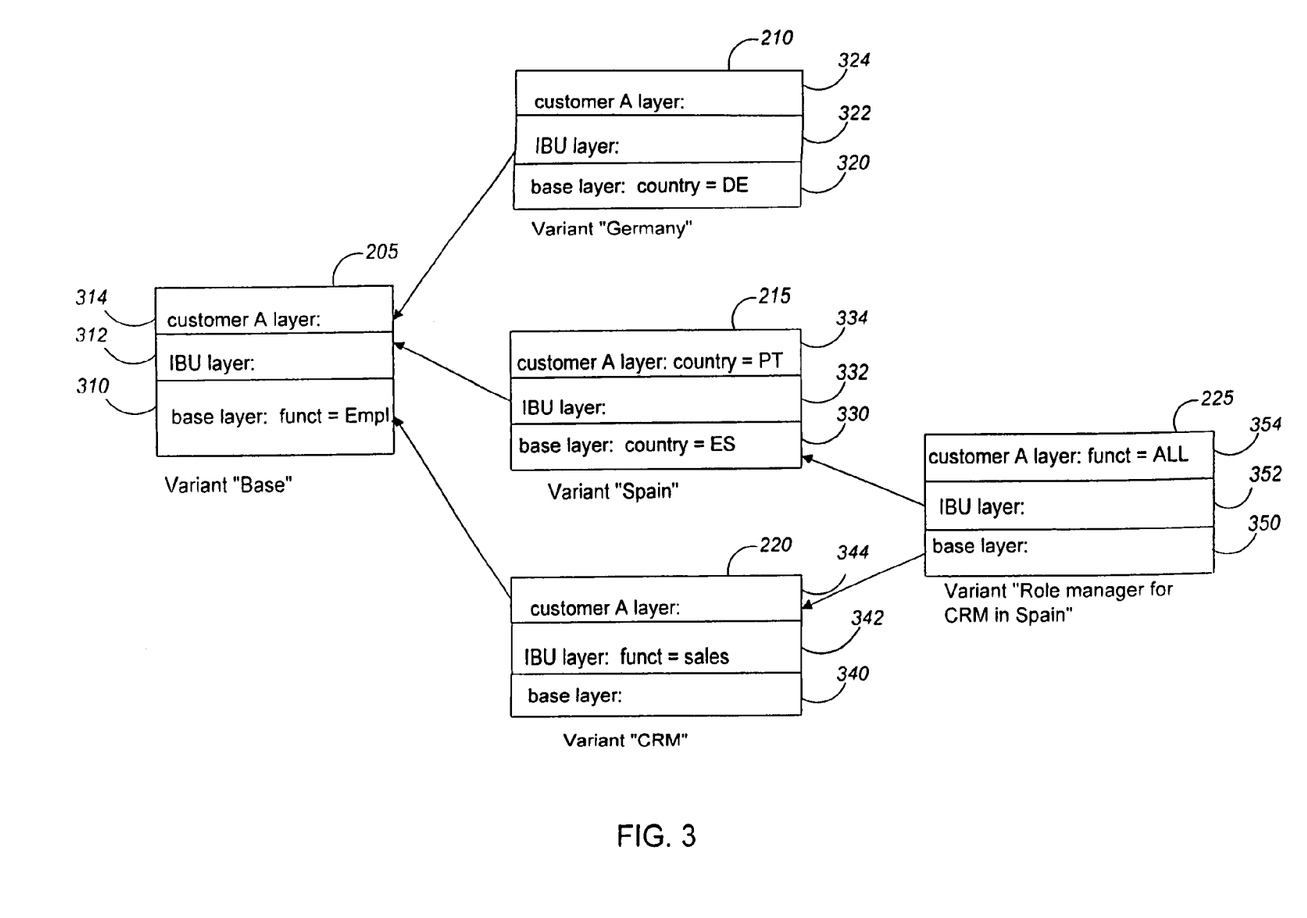
FIG. 3 is an example illustrating customization data defined by the variants and layers.

FIG. 3 is an example illustrating customization data defined by the variants and layers specified in FIG. 2A and FIG. 2B. The variants of the repository object 200 illustrated in FIG. 3 define customization data for the base layer 230, the IBU layer 235, and the layer for Customer A 245. No customization data is defined for the Customer B layer 240. The base variant 205 does not define any customization data for the Customer A layer 314 and the IBU layer 312, and defines the "funct" attribute as having the value "Empl" for the base layer 310. The Germany variant 210 does not define any customization data for the Customer A layer 324 and the IBU layer 322, and specifies the country attribute as having the value "DE" for the base layer 320. The Spain variant 215 does not define any customization data for the IBU layer 332, specifies the country attribute as having the value "PT" for the Customer A layer 334, and the value "ES" for the base layer 330. The CRM variant 220 does not specify any customization data for the Customer A layer 344 and the base layer 340, and specifies the "funct" attribute as having the value "Sales" for the IBU layer 342. The role manager for CRM in Spain variant 225 does not specify any customization data for the IBU layer 352 and the base layer 350, and specifies the "funct" attribute as having the value "All" for the Customer A layer 354.

Figure 4:
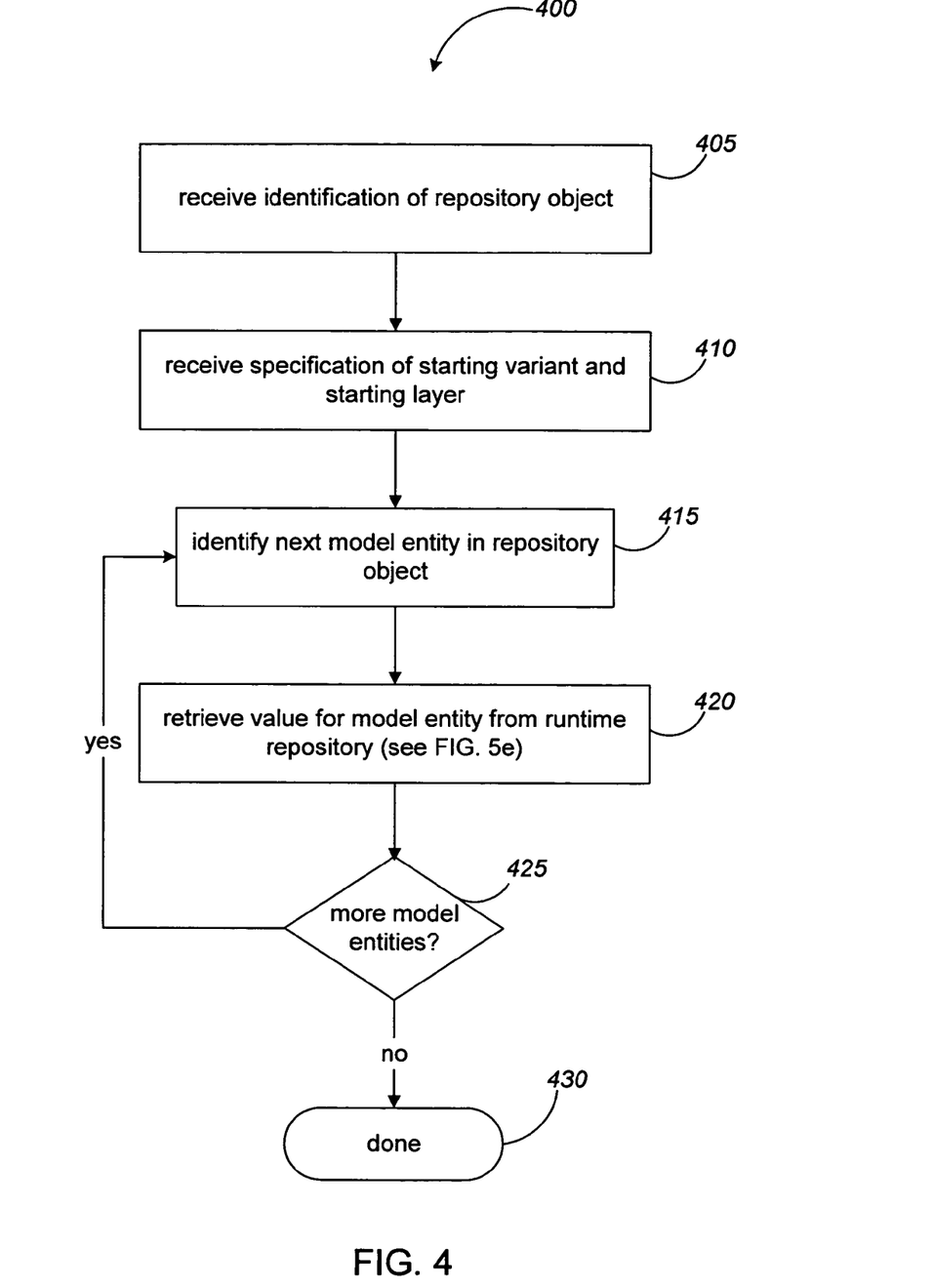
FIG. 4 is a flow diagram illustrating the merging of customization data for a repository object.

FIG. 4 is a flow diagram 400 illustrating a method for customizing a repository object starting from a specified variant and a specified layer. An identification of the repository object is received (step 405) along with a specification of a starting variant and a starting layer (step 410). The search for customization starts by identifying a model entity of the identified repository object (step 415), and retrieving a customization value for the identified model entity from the runtime repository (step 420). If there are more model entities that can have customization values ("yes" branch of decision step 425), the customization process continues and control is returned to step 415. If there are no remaining model entities that can have customization values ("no" branch of decision step 425), the process ends (step 430).

Figure 5:
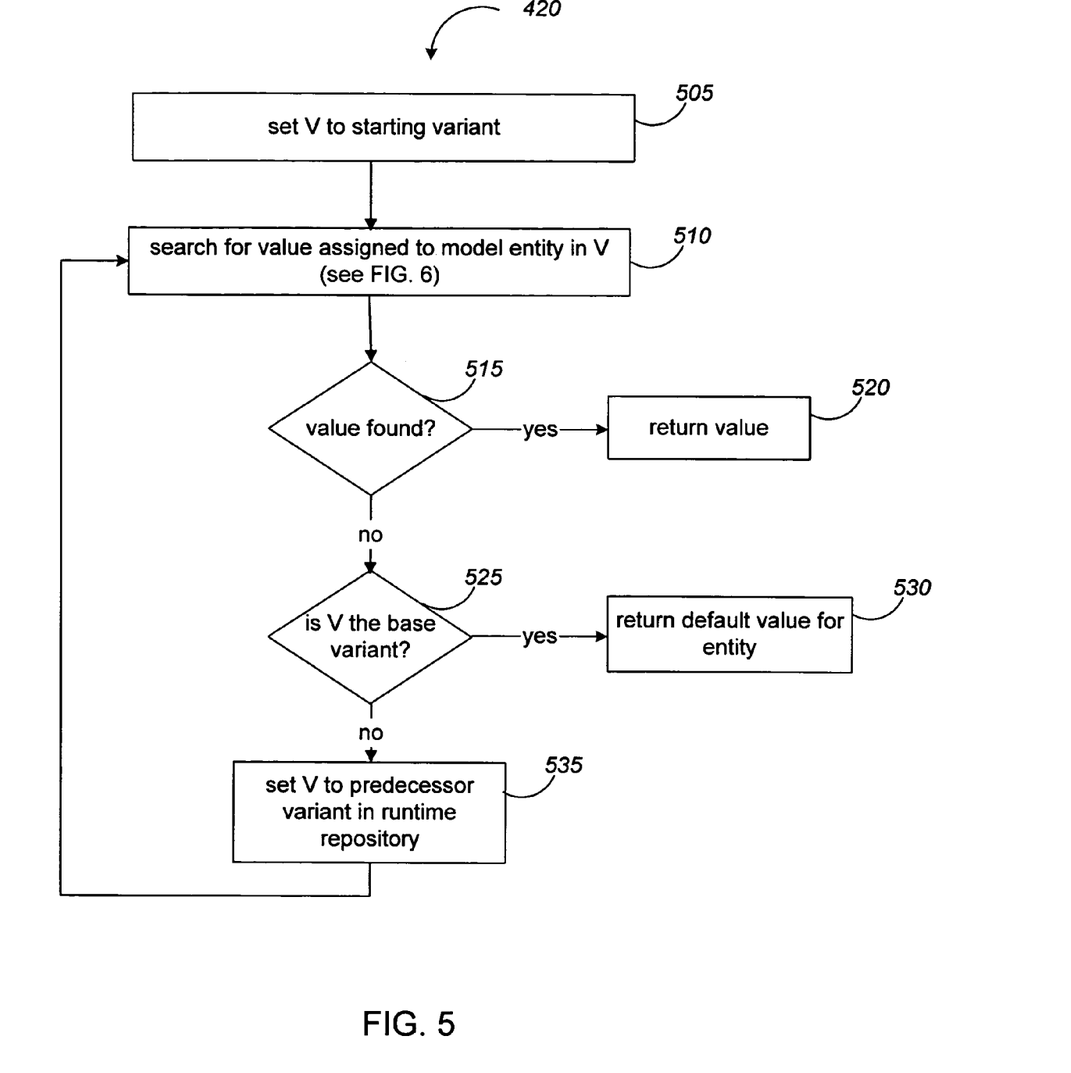
FIG. 5 is a flow diagram illustrating the merging of customization data for predecessor variants of a repository object.

FIG. 5 is a flow diagram illustrating a method for retrieving a customization value for the identified model entity from the runtime repository (step 420). A current variant to be searched (hereinafter variant V) is set to the starting variant specified in step 410 (step 505), and the variant V is searched for a customization value assigned to the currently identified model entity (step 510). If a customization value for the currently identified model entity is found ("yes" branch of decision step 515), the customization value is returned (step 520). If a customization value for the currently identified model entity is not found ("no" branch of decision step 515), the variant V is checked to determine if it is the base variant (step 525). If V is the base variant ("yes" branch of decision step 525), the default customization value for the model entity is returned (step 530). The default customization value can be a value specified by the base variant, or it can be a value based on other criteria, e.g., based on an entity type of the model entity. If V is not the base variant ("no" branch of decision step 525), variant V is set to next most specific variant in the variant graph (step 535) and control returns to step 510. If the variant V has only one predecessor variant, the predecessor variant is the next most specific variant. If the variant V has more than one predecessor variant, the next most specific variant is set to progress from the predecessor variant having the highest predecessor priority to the predecessor variant having the lowest predecessor priority.

Figure 6:
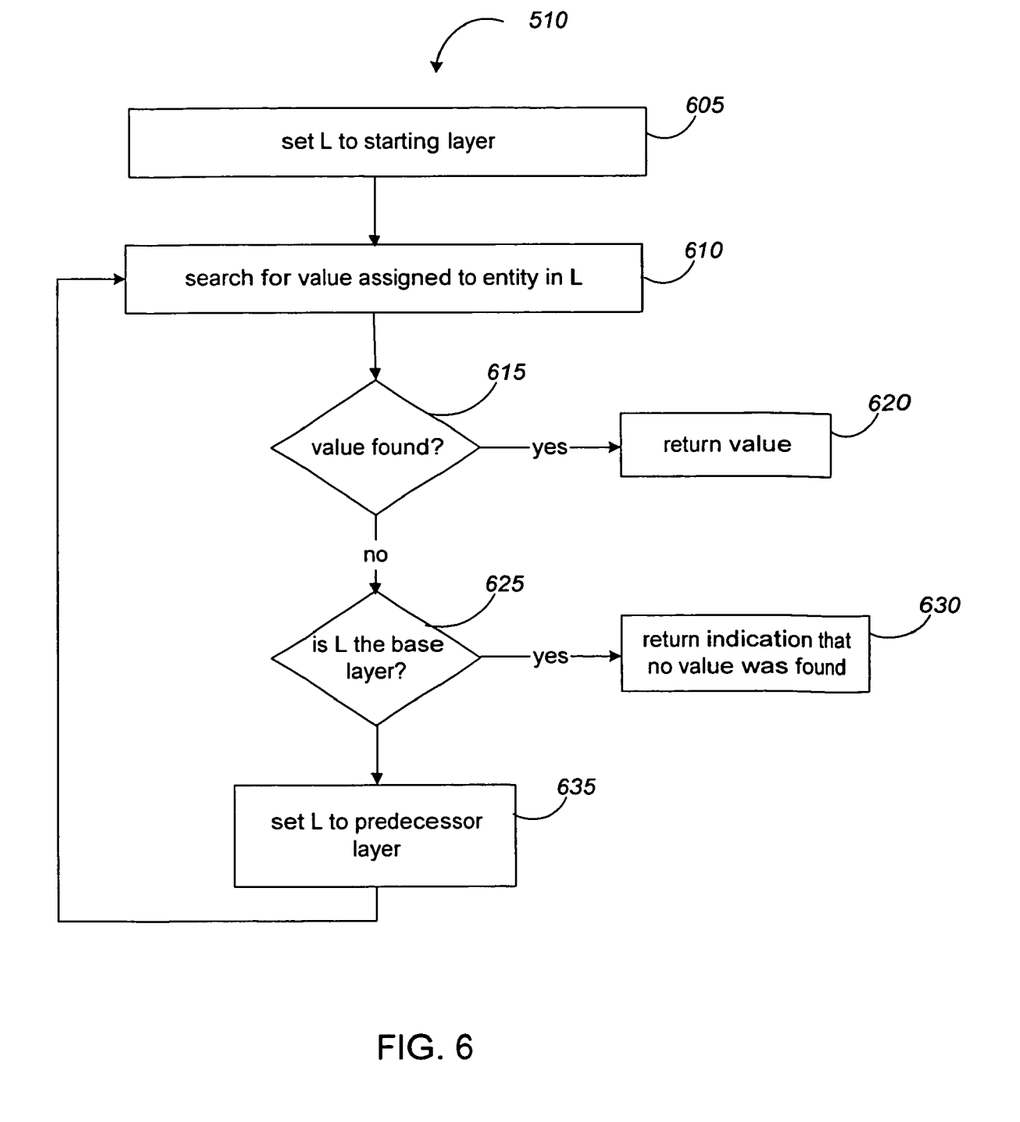
FIG. 6 is a flow diagram illustrating searching for the customization value assigned by a variant to a model entity.

FIG. 6 is a flow diagram illustrating a method of searching for the customization value assigned by variant V to a model entity in step 510. The current layer to be searched (hereinafter layer L) is set to the starting layer specified in step 410 (step 605), and the variant V is searched for a customization value assigned to the model entity in layer L (step 610). If a customization value for the model entity is found in layer L ("yes" branch of decision step 615), the found customization value is returned (step 620). If a customization value for the model entity is not found in layer L ("no" branch of decision step 615), the layer L is checked to determine if it is the base layer (step 625). If L is the base layer ("yes" branch of decision step 625), an indication is returned that no customization value for the model entity was found in variant V (step 630). If L is not the base layer ("no" branch of decision step 625), layer L is set to next most specific layer in the layer graph (step 635) and control returns to step 610. If the layer L has only one predecessor layer, the predecessor layer is the next most specific layer. If the layer L has more than one predecessor layer, the next most specific layer is set to progress from the predecessor layer having the highest predecessor priority to the predecessor layer having the lowest predecessor priority.

By using the above procedure to search for customization values for each model entity, the most specific customization value for model entity (i.e., the customization value assigned in the most specific variant and the most specific layer) can be retrieved for each model entity. The retrieved customization values for the model entities of the repository object are used to create the specified customization of the repository object specified in step 410.

A specific variant and a specific layer must be specified in order to retrieve a repository object from the runtime repository. In one implementation, the user specifies the specific variant when retrieving the repository object from the runtime repository. In an alternative implementation, the specific layer is specified during system configuration as a top-most layer to be used in a system. Table I illustrates the merged customization data for the repository object specified by the variants and layers in FIGS. 2A and 2B, when the repository object is retrieved for different specific variants and the topmost layer is specified to be Customer A.

TABLE I

| Specific variant for retrieving MRO | Value of "country" attribute | Value of "funct" attribute |
|---|---|---|
| Variant Role Manager for CRM | PT as defined in variant Spain, layer Customer A which takes precedence over layer base of the same variant. | All as defined in variant Role Manager for CRM as this takes precedence over variant Spain. |
| Variant Spain | PT as defined in variant Spain, layer Customer A which takes precedence over layer base of the same variant. | Empl as defined in variant base and layer base, because variant Spain has no value for this property. |
| Variant CRM | <default> as there is no value defined in variants CRM and base. | Sales as defined in variant CRM which takes precedence over variant base. |

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in a machine-readable storage device for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described herein, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The invention can be implemented in a computing system that includes a back-end component (e.g., a data server), a middleware component (e.g., an application server), or a front-end component (e.g., a client computer having a graphical user interface or a Web browser through which a user can interact with an implementation of the invention), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. In certain implementations, multitasking and parallel processing may be preferable. Other embodiments are within the scope of the following claims

What is claimed is:

1. A computer program product, tangibly embodied in a computer-readable storage device comprising instructions, which when executed on a processor, cause the processor to execute a method for storing customization data in a runtime repository, the method comprising:
   storing a repository object in the runtime repository, the repository object comprising one or more model entities;
   storing one or more variants for the repository object in the runtime repository, each of the variants representing a customization of the repository object according to a specific criterion, and each of the variants for the repository object being arranged in a first hierarchy;
   storing one or more layers for the repository object in the runtime repository, each of the layers representing a customization of the repository object according to a customizing party, and each of the layers being arranged in a second hierarchy, wherein the first hierarchy for the variants and the second hierarchy for the layers provide a multi-dimensional representation of customizations of the repository object, such that each of the customizations of the repository object is identified by one of the variants of the first hierarchy and one of the layers of the second hierarchy;
   storing a first set of customization values for one or more of the model entities in the runtime repository, the first set of customization values being stored in a first variant within the first hierarchy and in a first layer within the second hierarchy; and
   storing a second set of customization values for one or more of the model entities in the runtime repository, the second set of customization values being stored in the first variant within the first hierarchy and in a second layer within the second hierarchy.

2. The computer program product of claim 1, wherein the repository object is related to another repository object in the runtime repository according to a model.

3. The computer program product of claim 1, wherein the first hierarchy organizes the variants in order of specificity from a most specific variant to a least specific variant.

4. The computer program product of claim 3, wherein the least specific variant is a base variant.

5. The computer program product of claim 4, wherein the base variant comprises default values for the model entities in the repository object.

6. The computer program product of claim 1, wherein the second hierarchy organizes the layers in order of specificity from a most specific layer to a least specific layer.

7. The computer program product of claim 6, wherein the least specific layer is a base layer.

8. A computer program product tangibly embodied in a computer-readable storage device, comprising instructions, which when executed on a processor, cause the processor to:
   receive an identification of a model entity in an object, the object comprising one or more model entities;
   receive an identification of a starting variant in a repository, the repository storing customization values for the model entities in the object, the customization values being arranged in variants and layers, each of the variants representing a customization of the object according to a specific criterion and each of the layers representing a customization of the object according to a customizing party, each of the variants being organized according to a first hierarchy and each of the layers being organized according to a second hierarchy, wherein the first hierarchy for the variants and the second hierarchy for the layers provide a multi-dimensional representation of customizations of the object, such that each of the customizations of the object is identified by one of the variants of the first hierarchy and one of the layers of the second hierarchy, wherein the repository stores, in a first variant within the first hierarchy and in a first layer within the second hierarchy, a first set of customization values for one or more of the model entities, and further wherein the repository stores, in the first variant within the first hierarchy and in a second layer within the second hierarchy, a second set of customization values for one or more of the model entities;
   receive an identification of a starting layer in the repository; and
   search for an applicable customization value for the identified model entity from the customization values in the repository by searching for an applicable variant in a portion of the first hierarchy starting with the starting variant and searching for an applicable layer in a portion of the second hierarchy starting with the starting layer.

9. The computer program product of claim 8, wherein searching for the applicable variant comprises locating a most specific variant in the portion of the first hierarchy starting with the starting variant, the starting variant comprising a customization value for the identified model entity.

10. The computer program product of claim 9, wherein searching for the applicable layer comprises locating within the most specific variant a most specific layer in the portion of the second hierarchy starting with the starting layer, the starting layer comprising a customization value for the identified model entity.

11. The computer program product of claim 10, further comprising instructions, which when executed on the processor, cause the processor to:
   retrieve the customization value for the identified model entity in the most specific layer.

12. The computer program product of claim 8, further comprising instructions, which when executed on the processor, cause the processor to:
   retrieve a default value for the identified model entity if no applicable customization value is found.

13. The computer program product of claim 8, wherein the starting variant is specified when the repository is opened.

14. The computer program product of claim 8, wherein the starting layer is specified as a configuration setting.

15. A computer program product tangibly embodied in a computer-readable storage device, comprising instructions, which when executed on a processor, cause the processor to:
   receive a specification of an object, the object having one or more model entities;
   create one or more variants for the object in a repository, each of the variants representing a customization of the object according to a specific criterion, and each of the variants being arranged in a first hierarchy;
   create one or more layers for the object in the repository, each of the layers representing a customization of the object according to a customizing party, the layers being arranged in a second hierarchy, wherein the first hierarchy for the variants and the second hierarchy for the layers provide a multi-dimensional representation of customizations of the object, such that each of the customizations of the object is identified by one of the variants of the first hierarchy and one of the layers of the second hierarchy;

receive a first set of customization values for one or more of the model entities, an identification of a first variant within the first hierarchy, and an identification of a first layer within the second hierarchy;

store the first set of customization values in the first layer and in the first variant;

receive a second set of customization values for one or more of the model entities, and an identification of a second layer within the second hierarchy; and store the second set of customization values in the second layer and in the first variant.

16. The computer program product of claim 15, wherein: the first and second sets of customization values are received independently of each other.

17. The computer program product of claim 15, further comprising instructions, which when executed on the processor, cause the processor to:
modify the first hierarchy.

18. The computer program product of claim 17, wherein modifying the first hierarchy comprises adding a new variant to the first hierarchy or deleting a variant from the first hierarchy.

19. The computer program product of claim 15, further comprising instructions, which when executed on the processor, cause the processor to:
modify the second hierarchy.

20. The computer program product of claim 19, wherein modifying the second hierarchy comprises adding a new layer to the second hierarchy or deleting a layer from the second hierarchy.

21. The computer program product of claim 15, further comprising instructions, which when executed on the processor, cause the processor to:
mark a customization value in the first set of customization values as a final value to indicate that the customization value cannot be overridden by another customization value in a variant subsequent to the first variant in the first hierarchy or in a layer subsequent to the first layer in the second hierarchy.

22. The computer program product of claim 15, further comprising instructions, which when executed on the processor, cause the processor to:
receive an identification of a starting variant and a starting layer; and
for each model entity in the object, retrieve a customization value for the model entity by searching for an applicable variant in a portion of the first hierarchy starting with the starting variant and searching for an applicable layer in a portion of the second hierarchy starting with the starting layer.

23. The computer program product of claim 22, wherein the applicable variant is a most specific variant in the portion of the first hierarchy starting with the starting variant that contains a customization value for the model entity, and wherein the applicable layer is a most specific layer in a portion of the second hierarchy starting with the starting layer that contains a customization value for the model entity.

24. An apparatus comprising:
a processor;
a module configured to receive an identification of a model entity in an object, the object comprising multiple model entities;
a module configured to receive an identification of a starting variant in a repository, the repository storing customization values for the model entities in the object, the customization values being arranged in variants and in layers, each of the variants representing a customization of the object according to a specific criterion and each of the layers representing a customization of the object according to a customizing party, each of the variants being organized according to a first hierarchy and each of the layers being organized according to a second hierarchy, wherein the first hierarchy for the variants and the second hierarchy for the layers provide a multi-dimensional representation of customizations of the object, such that each of the customizations of the object is identified by one of the variants of the first hierarchy and one of the layers of the second hierarchy, wherein the repository stores, in a first variant within the first hierarchy and in a first layer within the second hierarchy, a first set of customization values for one or more of the multiple model entities, and further wherein the repository stores, in the first variant within the first hierarchy and in a second layer within the second hierarchy, a second set of customization values for one or more of the multiple model entities;
a module configured to receive an identification of a starting layer in the repository; and
a module configured to search for an applicable customization value for the identified model entity from the customization values in the repository by searching for an applicable variant in a portion of the first hierarchy starting with the starting variant and searching for an applicable layer in a portion of the second hierarchy starting with the starting layer.

25. An apparatus comprising:
a processor;
a module configured to receive a specification of an object, the object having one or more model entities;
a module configured to create one or more variants for the object in a repository, each of the variants representing a customization of the object according to a specific criterion, and each of the variants being arranged in a first hierarchy;
a module configured to create one or more layers for the object in the repository, each of the layers representing a customization of the object according to a customizing party, and each of the layers being arranged in a second hierarchy, wherein the first hierarchy for the variants and the second hierarchy for the layers provide a multi-dimensional representation of customizations of the object, such that each of the customizations of the object is identified by one of the variants of the first hierarchy and one of the layers of the second hierarchy;
a module configured to receive a first set of customization values for one or more of the model entities, an identification of a first variant within the first hierarchy, and an identification of a first layer within the second hierarchy;
a module configured to store the first set of customization values in the first layer and in the first variant;
a module configured to receive a second set of customization values for one or more of the model entities, and an identification of a second layer within the second hierarchy; and
a module configured to store the second set of customization values in the second layer and in the first variant.

* * * * *